United States Patent
Brown et al.

[11] Patent Number: 6,132,808
[45] Date of Patent: Oct. 17, 2000

[54] METHOD OF TREATING METALS USING AMINO SILANES AND MULTI-SILYL-FUNCTIONAL SILANES IN ADMIXTURE

[75] Inventors: Kevin Brown; Erwin Barry Bines, both of Buckinghamshire, United Kingdom; Jun Song; Nie Tang, both of Lake Bluff, Ill.

[73] Assignee: Brent International PLC, Buckinghamshire, United Kingdom

[21] Appl. No.: 09/245,601

[22] Filed: Feb. 5, 1999

[51] Int. Cl.[7] ........................................................ B05D 7/14
[52] U.S. Cl. .......................... 427/387; 427/409; 427/388.4
[58] Field of Search ..................................... 427/387, 409, 427/388.4

[56] References Cited

U.S. PATENT DOCUMENTS

| Re. 34,675 | 7/1994 | Plueddemann | 106/287.1 |
|---|---|---|---|
| 4,689,085 | 8/1987 | Plueddemann | 106/287.14 |
| 5,108,793 | 4/1992 | van Ooij et al. | 427/327 |
| 5,292,549 | 3/1994 | van Ooij et al. | 427/156 |
| 5,433,976 | 7/1995 | van Ooij et al. | 427/327 |
| 5,445,891 | 8/1995 | Kasuya | 428/450 |
| 5,750,197 | 5/1998 | van Ooij et al. | 427/318 |
| 5,759,629 | 6/1998 | van Ooij et al. | 427/384 |

FOREIGN PATENT DOCUMENTS

| 98/19798 | 5/1998 | WIPO . |
|---|---|---|
| 98/30735 | 7/1998 | WIPO . |

OTHER PUBLICATIONS

Hoernstroem et al, J. Adhes. Sci. Technol. 10(9), pp. 883–904, 1996.

Subramanian et al, Corrosion (Houston), 54(3), pp. 204–215, 1998.

*Primary Examiner*—Erma Cameron
*Attorney, Agent, or Firm*—Andrus, Sceales, Starke and Sawall, LLP

[57] ABSTRACT

The invention relates to a method of improving corrosion resistance of a metal. The method comprises applying a solution containing one or more amino silanes in admixture with one or more multi-silyl-functional silanes to a metal substrate in order to form a long term corrosion resistant coating. The method is particularly suitable for use on cold-rolled steel, zinc, iron, aluminium and aluminium alloy surfaces.

32 Claims, No Drawings

METHOD OF TREATING METALS USING AMINO SILANES AND MULTI-SILYL-FUNCTIONAL SILANES IN ADMIXTURE

BACKGROUND OF THE INVENTION

The present invention relates to a method of metal treatment. More particularly the invention relates to a method of improving corrosion resistance of a metal. The method has particular utility when the metal is to be subsequently painted, or operations such as bonding rubber to metals or bonding metals to metals are to be carried out subsequent to the silane treatment. The method comprises applying a solution containing one or more amino silanes in admixture with one or more multi-silyl-functional silanes to a metal substrate in order to form a corrosion resistant coating. The method is particularly suitable for use on cold-rolled steel, zinc, iron, aluminium and aluminium alloy faces,

DESCRIPTION OF RELATED ART

Most metals are susceptible to some form of corrosion, in particular atmospheric corrosion including the formation of various types of rust. Such corrosion may significantly affect the quality of such metal substrates, as well as that of the products produced therefrom. Although corrosion may often be removed from the metal substrates, these processes are often, time consuming costly and may further diminish the integrity of the metal. Additionally, where polymer coatings such as paints, adhesives or rubbers are applied to the metal substrates, corrosion of the base metal material may cause a loss of adhesion between the polymer coating and the base metal. Such a loss of adhesion between a coating layer and the base metal may likewise lead to corrosion of the metal.

Metallic coated steel sheet such as galvanized steel for example is used in many industries, including the automotive, construction and appliance industries. In most cases, the galvanized steel is painted or otherwise coated with a polymer layer to achieve a durable and aesthetically-pleasing product. Galvanized steel, particularly hot-dipped galvanized steel, however, often develops "white rust" during storage and shipment. White rust (also called "storage stain") is typically caused by moisture condensation on the surface of the galvanized steel which reacts with the zinc coating. White rust is aesthetically unappealing and impairs the ability of the galvanized steel to undergo subsequent process steps such as being painted or otherwise coated with a polymer. Thus, prior to such coating, the zinc surface of the galvanized steel must be pretreated in order to remove the white rust which is present, and prevent it from reforming beneath the polymer layer. Various methods are currently employed to not only prevent the formation of white rust during shipment and storage, but also to prevent the formation of the white rust beneath a polymer coating (e.g., paint).

It is well established that prevention of the formation of white rust on hot-dipped galvanized steel during storage and shipping can be achieved by treating the surface of the steel with a thin chromate film. While such chromate coatings do provide resistance to the formation of white rust, chromium is highly toxic and environmentally undesirable.

It is also known to employ a phosphate conversion coating in conjunction with a chromate rinse in order to improve paint adherence and provide corrosion protection. It is believed that the chromate rinse covers the pores in the phosphate coating, thereby improving the corrosion resistance and adhesion performance. Once again, however, it is highly desirable to eliminate the use of chromate altogether. Unfortunately, however, the phosphate conversion coating is generally not effective without the chromate rinse.

Aluminium alloys are particularly susceptible to corrosion as the alloying elements used to improve the metal's mechanical properties (e.g., copper, magnesium and zinc) will decrease corrosion resistance.

Recently, various techniques for eliminating the use of chromate have been proposed. These include the steps of providing an aqueous alkaline solution comprising an inorganic silicate and a metal salt in an amount to coat a steel sheet, followed by treating the silicate coating with an organofunctional silane (U.S. Pat. No. 5,108,793).

U.S. Pat. No. 5,292,549 teaches the rinsing of metal sheet with an aqueous solution containing low concentrations of an organofunctional silane and a cross linking agent in order to provide temporary corrosion protection. The cross-linking agent cross-links the organofunctional silane to form a denser siloxane film. The ratio range of silane to cross-linker is 20:1–2:1.

WO 98/30735 discloses a method of preventing corrosion using 2 treatment solutions, applied separately. The first solution employs a multi-silyl-functional silane cross-linker while the second solution employs an organofunctional silane.

U.S. Pat. No. 5,433,976 teaches the rinsing of a metal sheet with an alkaline solution containing a dissolved silicate or aluminate, an organofunctional silane and a cross-linking agent in order to form an insoluble composite layer containing siloxane.

WO 98/19798 relates to a method of preventing corrosion of metal sheet effected by the application of a solution containing one or more hydrolyzed vinyl silanes to the metal sheet. The method is particularly useful as a pretreatment step prior to painting of galvanized steel as the vinyl functionalities promote the adhesion between the metal surface and the paint coating. A disadvantage, however, is that the vinyl silanes do not bond particularly well to the metal surface.

U.S. Re. 34, 675 (re-issue of U.S. Pat. No. 4,689,085) describes coupling agent and primer compositions which comprise a conventional silane coupling agent and bis (trialkoxy) organo compound, and partially hydrolyzed products of such mixtures.

SUMMARY OF THE INVENTION

It is an object of the present invention to provide a method of providing long-term corrosion resistance to a metal substrate.

It is another object of the present invention to provide a method of providing a coating for long-term corrosion resistance to a metal substrate sheet which essentially employs a single-step treatment process.

It is a further object of the present invention to provide a treatment solution for providing a coating for corrosion resistance to metal substrate, wherein the treatment composition need not be removed prior to painting.

It is a further object of the present invention to provide a treatment coating and solution for promoting rubber to metal bonding.

It is a further object of the present invention to provide a treatment solution for promoting metal to metal bonding using adhesives.

The foregoing objects may be accomplished, in accordance with one aspect of the present invention, by providing a method of improving corrosion resistance of a metal substrate, comprising of the steps of:

(a) providing a metal substrate, the said metal substrate chosen from the group consisting of:

steel;

steel coated with a metal chosen from the group consisting of: zinc, zinc alloy, aluminium and aluminium alloy;

iron;

zinc and zinc alloys;

aluminium; and aluminium alloy; and (b) applying a long-term coating on the metal substrate by contacting the metal substrate with a solution containing one or more hydrolyzed or partially hydrolyzed amino silanes, one or more hydrolyzed or partially hydrolyzed multi-silyl-functional silanes and a solvent and substantially removing the solvent.

DETAILED DESCRIPTION OF THE PREFERRED EMBODIMENTS

The applicants have found that corrosion resistance of metal, particularly cold-rolled steel, steel coated with a metal chosen from the group consisting of zinc, zinc alloy, aluminium and aluminium and aluminium alloy, aluminium and aluminium alloy per se and iron, can be improved by applying a treatment solution containing one or more hydrolyzed or partially hydrolyzed amino silanes to said metal, wherein the treatment solution additionally contains one or more multi-silyl-functional silanes, having either 2 or 3 trisubstituted silyl groups, wherein the multi-silyl-functional silane(s) has been at least partially hydrolyzed. The treatment solution forms a long-term corrosion resistant coating upon curing.

The provision of a coating for long-term corrosion resistance is surprisingly superior to conventional chromate based treatments, and avoids the chromium disposal problem. In addition, the coating provides superior adhesion of the metal substrate to paint, rubber, adhesive or other polymer layers.

In addition to the above mentioned corrosion preventative properties of the treatment method of the present application, the applicant has also found that the above mentioned coatings exhibit particular utility in the promotion of rubber to metal bonding and metal to metal bonding using adhesives.

The treatment methods of the present invention may be used on any of a variety of metal substrates including particularly cold-rolled steel, steel coated with a metal chosen from the group consisting of zinc, zinc alloy, aluminium and aluminium and aluminium alloy, aluminium and aluminium alloy per se, and iron. The method of the present invention is effected by applying a treatment solution containing one or more hydrolyzed or partially hydrolyzed amino silanes to said metal, wherein the treatment solution additionally contains one or more multi-silyl-functional silanes having either 2 or 3 trisubstituted silyl groups to the metal, wherein the multi-silyl-functional silane (s) has been at least partially hydrolyzed.

As used herein, the term "substituted" aliphatic or aromatic means an aliphatic or aromatic group wherein the carbon backbone may have a heteroatom located within the backbone or a heteroatom or heteroatom containing group attached to the carbon backbone The preferred amino silanes which may be employed in the present invention each have a single trisubstituted silyl group, wherein the substituents are individually chosen from the group consisting of alkoxy, acyloxy and aryloxy. Thus, the amino silanes which maybe used in the present invention may have the general structure

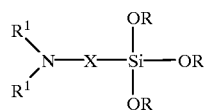

R is chosen from the group consisting of hydrogen, $C_1$–$C_{24}$ alkyl, preferably $C_1$–$C_6$ alkyl, $C_2$–$C_{24}$ acyl, preferably $C_2$–$C_4$ acyl, and each R may be the same or different. Preferably R is individually chosen from the group consisting of hydrogen, ethyl, methyl, propyl, iso-propyl, butyl, iso-butyl, sec-butyl ter-butyl and acetyl;

X is a group selected from the group consisting of a bond, a substituted or unsubstituted aliphatic or aromatic group. Preferably X is selected from the group chosen from the group consisting of a bond, $C_1$–$C_6$ alkylene, $C_1$–$C_6$ alkenylene, $C_1$–$C_6$ alkylene substituted with at least one amino group, $C_1$–$C_6$ alkenylene substituted with at least one amino group, arylene and alkylarylene;

$R^1$ is a group individually selected from the group consisting of hydrogen, $C_1$–$C_6$ alkyl, $C_1$–$C_6$ alkenyl, $C_1$–$C_6$ alkyl substituted with at least one amino group, $C_1$–$C_6$ alkenyl substituted with at least one amino group, arylene and alkylarylene. Preferably $R^1$ is individually selected from the group consisting of hydrogen, ethyl, methyl, propyl, iso-propyl, butyl, iso-butyl, sec-butyl ter-butyl and acetyl.

The particular preferred amino silane employed in the method of the present invention is γ-aminopropyltriethoxysilane, which will be referred to as γ-APS, and having the structure:

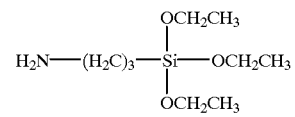

More than one multi-silyl-functional silane may be employed in the treatment solution. The, or each multi-silyl-functional silane has at least 2 trisubstituted silyl groups, wherein the substituents are individually chosen from the group consisting of alkoxy and acyloxy. Preferably the multi-silyl-functional silane of the present invention has the general structure

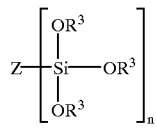

wherein Z is selected from the group consisting of either a bond, an aliphatic or aromatic group; each $R^3$ is an alkyl or acyl group, and n is 2 or 3.

Each $R^3$ is chosen from the group consisting of hydrogen, $C_1$–$C_{24}$ alkyl, preferably $C_1$–$C_6$ alkyl, $C_2$–$C_{24}$ acyl, preferably $C_2$–$C_4$ acyl, and may be the same or different. Preferably each $R^3$ is individually selected from the group consisting of ethyl, methyl, propyl, iso-propyl, butyl, iso-butyl, sec-butyl, ter-butyl and acetyl.

Preferably Z is selected from the group consisting of a bond, $C_1$–$C_6$ alkylene, $C_1$–$C_6$ alkenylene, $C_1$–$C_6$ alkylene substituted with at least one amino group, $C_1$–$C_6$ alkenylene substituted with at least one amino group, arylene and alkylarylene. In the case where Z is a bond, the multi-functional silane comprises two trisubstituted silyl groups which-are- bonded -directly-to-one-another.

The preferred multi-silyl-functional silane is 1,2-bis-(triethoxysilyl)ethane, referred to as BTSE and having the structure:

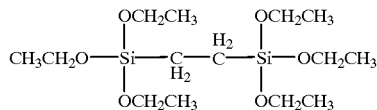

Other suitable multi-functional silanes include 1,2-bis-(trimethoxysilyl)ethane (TMSE), and 1,6-bis-(trialkoxysilyl)hexanes (including 1,6-bis-(trimethoxysilyl) hexanes), 1,2-bis-(triethoxysilyl)ethylene, 1,4-bis-(trimethoxysilylethyl)benzene, and bis-(trimethoxysilylpropyl)amine.

The above-described amino and multi-functional silanes must be at least partially, and preferably fully hydrolyzed so that the silanes will bond to the metal surface. During hydrolysis, the alkyl or acyl groups (i.e., the "R" and "$R^3$" moieties) are replaced with a hydrogen atom. As used herein, the term "partially hydrolyzed" simply means that only a portion of the alkyl or acyl groups on the silane have been replaced with a hydrogen atom. The silanes should preferably be hydrolyzed to the extent that at least two of the alkyl or acyl groups on each molecule have been replaced with a hydrogen atom. Hydrolysis of the silanes may be accomplished merely be mixing the silanes with water, and optionally including a solvent such as an alcohol in order to improve solubility.

One significant advantage of the present invention is that the treatment solution may be applied directly onto the surface of the metal without the need for an underlying layer of silicates, aluminate or other coating. Another significant advantage is the utility and convenience to the user of a one step treatment.

The present invention is particularly suitable if, subsequent to treatment of the metal substrate being carried out, the metal substrate is to be painted or coated with a polymer such as an adhesive or rubber. This may take place after one or more silane treatments, and advantageously after curing of said silane treatment(s).

The pH of the solution is also preferably maintained below about 7, and, most preferably between about 3 and about 6, in order to improve hydrolysis. The pH may be adjusted, for example, by the addition of an acid, such as acetic, oxalic, formic or propionic acid. If the pH is permitted to increase above about 7, the hydrolyzed multi-functional silane may begin to polymerize via a condensation reaction. If this is permitted to occur, the corrosion resistance will be significantly reduced since the silane may not bond strongly to the metal surface.

The concentration of multi-silyl-functional silanes such as BTSE in the solution should be between about 0.01% and about 10%, preferably greater than 0.1%. More preferably, a concentration of between about 0.4% and about 3%, most preferably about 2% is preferred.

The concentration of amino silanes in the solution should be between about 0.01 and 10%. More preferably, a concentration of between about 0.2% and about 2%, most preferably about 1% is preferred.

The ratio between the amino silanes and the multi-silyl-functional silanes is essential to the efficacy of the present invention in providing long-term corrosion resistance. The term "long-term" as used herein is relative to "temporary corrosion protection" coating, such as that disclosed in the patent U.S. Pat. No. 5,292,549, in which it claimed "the siloxane film may be removed by rinsing the metallic coated steel sheet in an alkaline solution prior to coating the sheet with a phosphate conversion coating and a paint." In the context of corrosion resistance "long-term" means a coating which resists being washed off or removed. The present invention shows superior properties on metal surface and resists being removed by a alkaline solution. This aspect can be assessed by using an alkaline rinse solution, as set out in Example 9, to try to remove the coatings of the present invention. The ratios of amino silanes and the multi-silyl-functional silanes used in the present invention are in the range 4:1–1:8, preferably 2:1–1:4, more preferably a ratio of greater than 1:2.

Although a more concentrated solution will provide a greater film thickness on the metal, this comes at the expense of increased cost. In addition, thicker films are often weak and brittle. The film thickness is generally in the range of 0.05–0.2 $\mu$m.

It should be noted that the concentration of silanes discussed and claimed herein are all measured in terms of the ratio between the amount of unhydrolyzed, multi-silyl-functional silanes employed (i.e., prior to hydrolyzation), and the total volume of treatment solution components (i.e., silanes, water, optional solvents and pH adjusting acids). In addition, the concentrations refer to the total amount of unhydrolyzed multi-silyl-functional silanes added, as multiple silanes may optionally be employed in this treatment solution.

The solution temperature is not critical. Temperatures down to 0° C. should be satisfactory. There is no need to heat the solution but a temperature of between 15 and 60° C. for the treatment bath during treatment will be satisfactory. Higher temperatures may cause polymerisation of the silane (i.e. they may shorten the bath life) and will have no benefit.

Since the solubility in water of some of the silanes used may be limited, the treatment solution may optionally include one or more solvents, such as alcohols, in order to improve silane solubility. The alcohol may also improve the stability of the treatment solution, as well as the wettability of the metal substrate. The use of alcohols or other non-aqueous solvents such as acetone is also particularly useful for metal substrates which are prone to corrosion upon contact with water (such as galvanic corrosion of certain alloys, including CRS). Particularly preferred alcohols include: methanol, ethanol, propanol, butanol and isomers thereof. The amount employed will depend upon the solubility of the particular multi-silyl-functional silanes in the treatment solution and thus the concentration range of alcohol to water in the treatment solution of the present invention is in the ratio of 1:99 to 99:1, (by volume). There should be sufficient water to ensure at least partial hydrolysis of the silane, and thus it is preferable that at least 5 parts of water be employed for every 95 parts of alcohol. Alcohols may, however, be omitted entirely if the silane(s) is soluble in water. When alcohols are employed, methanol and ethanol are the preferred alcohols.

Preparation of the treatment solution itself is straightforward. The unhydrolyzed amino silanes are prehydrolyzed by diluting with water to obtain a desired concentration. The pH may be adjusted using an acid as described above. The BTSE is prehydrolyzed by using a similar method and the solutions are mixed and the pH be adjusted using acid. Alcohol may optionally be employed to aid solubility or stability as required. In practice the baths will be replenished with the silanes utilised in the invention. These may be supplied pre-hydrolyzed and pre-mixed as a water dilutable concentrate.

The metal substrate to be treated is preferably solvent and/or alkaline cleaned (by techniques well-known in the prior art) prior to application of the above-described treatment composition of the present invention. The treatment solution may then be applied to the cleaned metal by either dipping the metal into the solution (also referred to as "rinsing"), spraying the solution onto the surface of the metal, or even wiping or brushing the treatment solution onto the metal substrate Indeed any method which leaves a substantially even film on the surface may effectively be employed When the preferred application method of dipping is employed, the duration of dipping is not critical, as it will generally not affect the resulting film thickness. It is preferred that the dipping time be between about 2 seconds and about 50 minutes, preferably between about 0.5 minutes and 2 minutes to ensure complete coating of the metal.

If the metal is not to be coated with a polymer such as paint, and particularly in the case of aluminium and aluminium alloys, the silane coating should advantageously be cured following the application process described above. Curing will polymerize the hydrolyzed silanol groups. The metal may be blown dry or dried in place.

The silane treatment coating may be cured at a temperature of between about 40° C. and 180° C. The curing time is dependant upon the curing temperature although this time is not crucial. It is sufficient just to dry the article in the shortest possible time. Lower temperatures would excessively lengthen drying times. After curing, a second treatment solution may be applied or the first treatment solution may be reapplied, and cured if desired. Curing times may be between 0.5 minutes and 1 hour but preferably a curing period of between about 0.5 minutes and 3 minutes is used. Curing will eventually take place even at room temperatures over a sufficient period of time. The metal substrate may be painted immediately but this is not essential.

The examples below demonstrate some of the superior and unexpected results obtained by employing the methods of the present invention.

The standard pretreatments, comparative pretreatments and testing used in the assessment of the efficacy of the present invention are as follows:

Testing

The accelerated corrosion tests were BS 6496 Acetic Acid Salt Spray for aluminium and BS 6497 Acetic Acid Salt Spray for zinc, ASTM B117 Neutral salt Spray for steel and zinc. Both these methods were applied for 1000 hour tests.

A shorter test was introduced to speed up the selection process and found to give close correlation of the results within sets of test substrates to the salt spray method. This shorter test comprised immersing scored panels in a 2 wt % sodium chloride solution at 55° C., pH 7±0.25, for 5 days and examining the extent of paint disbandment.

Paint adhesion was evaluated using reverse impact according to BS 3900 part E3 and a modified cupping method where the paint film is scored through to the metal substrate in a grid pattern of orthogonal lines spaced 1.5 mm apart to generate 100 individual squares of paint followed by cupping in accordance with BS 3900 part E4 to a fixed depth. After cupping, adhesive tape is applied to establish the degree of paint detachment induced by the metal distortion. The loss is expressed as the number of squares detached (=percent of grid pattern).

Aluminium panels with powder coat paint were also subjected to a pressure cooker test according to BS 6496 para 17.

Concentrates

Pretreatment chemicals are normally supplied as a concentrate that is diluted with water to generate the working solution. Two concentrated solutions have so far been prepared that have exhibited stable storage characteristics:

1) 4 vol. % BTSE+2 vol. % APS in ethanol+water.

2) 8 vol. % BTSE+4 vol. % APS in ethanol+water.

A mixture of 20 vol. % BTSE+10 vol. % APS was found to be unusable because the solution gelled after ~4 days. Although the gel did disperse to form a uniform clear solution on stirring with water, the supply of a concentrate as gel would be impractical for most end users. We expect to be able to produce a concentrate somewhere in the range 8 to 20 vol. % BTSE+4 to 10 vol. % APS.

Cyclic Fatigue Testing

A typical cyclic fatigue test would be 500,000 cycles at an applied cyclic force of +/−1200 N at a frequency of 8 Hz. All the variants passed this test without failure.

EXAMPLE 1

Electropaint

6"×4" test panels were spray cleaned in Pyroclean® 1055 (a silicated multi-metal cleaner) for 3.5 minutes at 55° C. The panels were then processed as follows for the standards against which the silane pretreatments were gauged:

Steel: This was conditioned in 2 g/l Parcolene® X for 30 seconds at ambient, immersed in Bonderite® 26SF (a trication zinc phosphate) for 3 minutes at 50° C. to produce a fine crystalline zinc phosphate coating of ⁻2.1 $g/m^2$. Post-rinse in Parcolene® 86 (a chrome III solution) at 1.5 g/l followed by rinsing and drying.

Zinc: (electrogalvanized (EZ) and hot-dip galvanized (HDG))—The same process conditions were used as above. The silane mixture shown in Table 1 are as follows: (1) 2 vol % BTSE+1 vol % γ-APS.

TABLE 1

| | Corrosion (mm paint loss × % of score line) | | | |
| --- | --- | --- | --- | --- |
| | Steel | | Electrogalv | |
| Electropaint | Bonderite ® 26SF | Silane mix (1) | Bonderite ® 26SF | Silane mix (1) |
| 1000 hr salt spray | 0 | 1–3 × 100 | — | — |
| 120 hr hot salt soak | 0 | 0 | 2 × 75 | 1–4 × 100 |

EXAMPLE 2

Powder-coat Paint

Steel: A cleaner-coater was used that simultaneously cleaned and phosphated the metal surface. The panels were sprayed with Pyrene® 2–68 at 60° C. for 3 minutes to produce an iron phosphate coating weight of 1.1 $g/m^2$. This coating was given a post-rinse of Pyrene Eco Seal® 800 at 5 g/l.

Zinc (EZ & HDG): A cleaner-coater was used as above but one formulated for zinc and aluminium. The panels were sprayed with Pyrenem® 2–69 at 60° C. for 3 minutes to produce a coating weight on steel of 0.65 $g/m^2$. The phosphate coating was post-rinsed with Pyrene Eco Seal® 800 at 5 g/l.

Aluminium: The same processing as for zinc above. Table 2 shows the results of 1000 hour salt spray testing on powder coated steel, hot-dip galv and aluminium. The silane mixture shown in Table 2 are as follows: (1) 2 vol % BTSE+1 vol % γ-APS.

TABLE 2

1000 hour salt spray testing on powder coated steel, hot-dip galv and aluminium 1000 hr Salt Spray Results
Corrosion (mm paint loss × % o score line)

| Powdercoat | Steel | | Hot dip galv. | | Aluminium | |
|---|---|---|---|---|---|---|
| Type | Pyrene ® 2-68 | Silane mix (1) | Pyrene ® 2-68 | Silane mix (1) | Pyrene ® 2.69 | Silane mix (1) |
| Polyester /Epoxy | 5–6 × 100 | 1.2 × 100 | Tot. paint loss | 2 × 10 | — | — |
| Polyester | — | — | 1–8 × 100 | 2–6 × 20 | 0 | 0 |

Table 3 shows the results of adhesion testing of powder coat films. The silane mixture shown in Table 3 are as follows: (1) 2 vol % BTSE+1 vol % γ-APS.

TABLE 3

Adhesion testing of powder coat films

| | | Hot dip galv. | | Aluminium | |
|---|---|---|---|---|---|
| Polyester powder coat | Steel | Pyrene ® 2-69 | Silane mix (1) | Pyrene ® 2-69 | Silane mix (1) |
| Paint Loss (%) | N/A | 100 | 0 | 36074 | 0 |

Table 4 shows the results of different BTSE/APS ratios in a 120 hr hot salt soak on zinc.

TABLE 4

120 hr hot salt soak on zinc

| silane composition | 120 hr hot salt soak on zinc (mm paint loss × % of score line) |
|---|---|
| 2% BTSE + 2% APS | 1–2 × 80 |
| 2% BTSE + 1% APS | 1 × 100 |
| 2% BTSE + 0.5% APS | 1–3 × 90 |
| 2% BTSE + 0.25% APS | >10 × 100 |
| 2% BTSE + 0.3% APS | 1 × 100 |
| 1% BTSE + 2% APS | 1 × 90 |
| 0.5% BTSE + 2% APS | 1 × 40 |

EXAMPLE 3

Silane Pretreatment

The preparation of the silane solution (2% v/v BTSE+1% v/v γ-APS and (2% v/v BTSE+0.5% v/v γ-APS) was as follows: 3 parts by volume of BTSE was mixed with 4 parts by volume of demineralised water and 17 parts by volume of industrial methylated spirits. This mix was left for 7 days. The γ-APS was hydrolyzed before use by adding 5% v/v water, mixing and leaving for 24 hours. This solution was then diluted with demineralised water to give 0.5 and 1% v/v γ-APS and the pH adjusted to 6 with acetic acid. Enough hydrolyzed BTSE was then added to the neutralised γ-APS to give 2% BTSE.

For the application to steel as a pretreatment it has been found that the pH of the silane solution can adversely affect some grades and/or surface finishes of steel by causing rusting. We have found that applications of solution at pH 6 have been consistently reliable for all the variants we have encountered so far. For ease of operation this pH has also been adopted for zinc and aluminium, although lower pH's could be tolerated when applying silanes to these substrates.

The substrates are immersed for 30 seconds in the solution, allowed to drain for a short period, then dried in an oven at 85° C.

The electropaint panels were coated with a layer of 30 μm thickness while the powder coated components were given 60 to 90 μm paint films. Panels were then subjected to accelerated corrosion testing and paint film adhesion testing.

EXAMPLE 4

Coil-coat Applications on Three Substrates

γγAPS/BTSE was treated on ACT CRS, Baycoat Hot Dipped Galvanized Steel (HDG) and Galvalume® panels. The control panels were B1000 P60 DIW for CRS, Chromate treatment on Baycoat production line for HDG and Galvalume. Galvalume panels were painted with primer (m856-016) and top coat (22-20752); HDG panels were painted with primer (PMY 0154) and top coat (SPG 0068), made by Lilly Industries; CRS panels were painted with 80G Newell White Polyester (408-1-w976), made by Specialty Coating Company. They are all polyester base paint.

Table 5 shows the corrosion test results (Salt Spray Test Results(mm) (Polyester Coil paint)) for the following compositions.

1. γ-APS 0.5% vol.+BTSE 2% vol. pH=5
2. γ-APS 1% vol.+BTSE 2% vol. pH=5
3. Control treatment

TABLE 5

Salt Spray Test Results (mm)

| Treatment | Galvalume ® 744 hrs. | | HDG 1080 hrs. | CRS 336 hrs. |
|---|---|---|---|---|
| Solution | Edge | Scribe | Scribe | Scribe |
| 1 | 2.0 ± 0.3 | 0 | 4.4 ± 0.2 | 3.6 ± 0.4 |
| 2 | 1.6 ± 0.1 | 0 | 4.1 ± 0.3 | 0.9 ± 0.1 |
| 3 | 3.4 ± 0.6 | 0 | 7.0 ± 1.0 | 4.4 ± 0.4 |

EXAMPLE 5

Treatment for CRS

The treatment used to treat ACT cold-rolled steel panels was a solution composed of 2–6% γ-APS, 0.5–2% BTSE, 0.01–0.1% acetic acid, 5–15% alcohol and 80–90% deionized water. River Valley paint (polyester base) was the top coat for the silane treated and zinc phosphate/chrome treated panels (purchased from ACT). The panels were tested in a salt spray chamber for 216 hours. Table 6 shows the test result

TABLE 6

Salt spray test results of River Valley painted CRS panels

| Treatment | Creepage, mm |
|---|---|
| γ-APS/BTSE | 0.7 ± 0.3 |
| Zinc Phosphate/Chrome | 1.0 ± 0.2 |

EXAMPLE 6

Aluminium alloy grade 5251 test panels were processed using γ-APS/BTSE as follows:
1. The aluminium sheets were Immersion cleaned in Pyroclean 630 (25 g/l, 70° C., 5 minutes). (Pyroclean® 630 is a silicated alkaline, non-etch cleaner).
2. The sheets were cold water rinsed. Note: The BTSE was hydrolyzed before use as follows:
3 parts by volume of BTSE was mixed with 4 parts by volume of demineralised water and 17 parts by volume of industrial methylated spirits. This mix was left for 7 days.
3. The γ-APS was hydrolyzed before use by adding 5% v/v water, mixing and leaving for 24 hours. This solution was then diluted with demineralised water to give 0.5 and 1% v/v γ-APS and the pH adjusted to 6 with acetic acid Enough hydrolyzed BTSE was then added to the neutralised γ-APS to give 2% BTSE. The cleaned and rinsed sheets were immersed in these BTSE/γ-APS solutions for 30 seconds.
4. The panels were then dried at 80° C.

As a comparison 5251 panels were processed in chromate pretreatment as follows:
1. Immersion cleaned in Pyroclean 71 (25 g/l, 70° C., 5 minutes). (Pyroclean 71 is a non-silicated alkaline no-etch cleaner).
2. Cold water rinsed.
3. Immersed in Aluma Etch 701 (40 g/l Aluma Etch® 701 kadditive, 50° C., 2 minutes).
4. Cold water rinsed.
5. Immersed in 10% v/v nitric acid (to remove smut left by the etch).
6. Cold water rinsed.
7. Immersed in Bonderite 711® (15 g/l, 40° C., 4 minutes, coating weight 0.74 g/m²). (Bonderite 711 is a process designed to give yellow chromate conversion coatings suitable for overpainting).
8. Cold water rinsed.
9. Demineralised water rinsed.
10. Dried in a current of compressed air.

Both the chromated and silane treated panels were painted with:
(a) A 2 pack liquid paint (believed to be polyurethane) used in the architectural aluminium industry prepared by mixing 6 parts paint with 1 part hardener and stoved at 120° C. for 3 minutes to produce a paint film thickness of 50μm.
(b) A polyester powder-coat paint stoved at 200° C. metal temperature for 10 minutes to produce a minimum paint film thickness of 60μm.

The panels were subjected to 1000 hours BS 6496 Acetic Acid Salt Spray, the panels painted with the 2 pack liquid paint were subjected to 4 mm reverse impact and 3 mm and 7 mm Erichsen Indentation/1.5 mm cross hatch adhesion tests. The results for the tests are shown in table 7 and 8 respectively.

TABLE 7

1000 hours Acetic Acid Salt Spray Test

| | 2 pack liquid paint Paint Removal | | Powder coat Paint Removal | |
|---|---|---|---|---|
| | mm × % | mm × % | mm × % | mm × % |
| Bonderite ® 711 (chromate) | 2.5 × 5 | 2.5 × 20 | 0 | 0 |
| BTSE 2%/γ-APS 1% | 0 | 0 | 0 | 0 |
| BTSE 2%/γ-APS 0.5% | 0 | 2 × 10 | 0 | 0 |

TABLE 8

Reverse Impact and 3 mm and 7 mm Erichsen Indentation/ 1.5 mm Cross Hatch Adhesion Tests

| | 2 pack liquid paint | | |
|---|---|---|---|
| | | Erichsen/Cross Hatch | |
| | Reverse Impact | 3 mm Indent % Adhesion | 7 mm Indent % Adhesion |
| Bonderite ® 711 (chromate) | Partial removal to 10 mm | 100 | 100 |
| BTSE 2%/γ-APS 1% | Partial removal to 10 mm | 100 | 95 |
| BTSE 2%/γ-APS 0.5% | Partial removal to 10 mm | 100 | 100 |

EXAMPLE 7

Pretreatment for coil aluminium

Aluminium (alloy grades 3005 and 3105 test panels We processed as follows:
1. Immersion in Pyroclean 630 (25 g/l, 70° C., 5 minutes).
2. Cold water rinsed.
3. Immersed in the silane solution for 10 seconds, passed through rubber squeegee rollers to remove excess liquid and oven dried at 80° C.

Silane solutions used:
BTSE 2%+γ-APS 1%, pH 4.9
BTSE 2%+γ-APS 0.5%, pH 5.0

As a control 3005 and 3105 test panels were cleaned and rinsed as above and coated with a chromium coating rinse process as follows. Accomet C® (a chrome containing no-rinse process supplied by Albright and Wilson) was diluted to 12.5% v/v, poured over the panels which were then spun to remove the excess liquid and dried at 105° C. The chromium coating weight on the panels was 45 mg Cr/m².

The panels were painted with Polycoat polyester paint supplied by Bollig and Kemper. The panels were cured at a peak metal temperature of 243° C. for 40 seconds. The dry paint film thickness was 17μm.

The panels wer subjected to 1000 hours BS 6496 Acetic Acid Salt Spray and a T bend adhesion test (to ECCA-T20 [1992] specification). The results are shown in tables 10 and 9 and 10.

TABLE 9

1000 hours Acetic Acid Salt Spray

| | Paint Removal | |
|---|---|---|
| | 3005 Alloy mm × % | 3105 Alloy mm × % |
| Accomet C (Cr no rinse) | 1 × 10 | 1 × <5 |
| BTSE 2%/γ-APS 1% | 1 × 5 | 0 |
| BTSE 2%/γ-APS 0.5% | 1 × 10 | 1 × 5 |

TABLE 10

T Bend

| | 3005 Alloy | | 3105 Alloy | |
|---|---|---|---|---|
| | OT | ½T | OT | ½T |
| Accomet C (Cr no rinse) | Cracking only. | No Removal. | Cracking only. | No Removal. |
| BTSE 2%/γ-APS 1% | Cracking only. | No Removal. | Cracking only. | No Removal. |
| BTSE 2%/γ-APS 0.5% | Cracking only. | No Removal. | Cracking only. | No Removal. |

EXAMPLE 8

Rubber Bonding

Current practice in metal to rubber bonding, as used extensively in the automotive industry for shock absorber and anti-vibration mountings, is to phosphate the metal parts, then apply a primer coating followed by a topcoat to which the rubber is bonded. From processed parts supplied to various manufacturers the applicants have established that a silane application to the metal surface followed by the topcoat (no primer coating) produces a metal-rubber bond of strength and durability equal to the current system.

Metal parts have been processed in two different silane mixtures (2% BTSE+0.5% APS pH 5.5, 2% BTSE+1% APS pH 5.5) both at ambient for 30 seconds followed by drying at 100° C. and subjected to cyclic fatigue testing to determine the strength and failure mode of the composite structure.

Ultimate strength measurements:

| 2% BTSE + 0.5% APS | 7834 N |
|---|---|
| 2% BTSE + 1.0% APS | 8635 N |

In all cases the failure occurred within the rubber and not at a metal-rubber interface. For the current practice a value >3500 N is required.

EXAMPLE 9

Long-Term Corrosion Resistance Assessment

CRS, HDG 70G and aluminium 3003 were selected as test substrate. Alkaline cleaner Brent Chem clean 1111 (AC1111) which is similar to Parker 338, was selected as cleaner for CRS and HDG. The substrates were rinsed in AC 1111 (at 15 g/l) for 2 minutes at 140° F. Because a strong, uninhibited alkaline cleaner, such as AC1111, will attack and dissolve aluminium, AC 1220 was selected to clean aluminium 3003. The AC 1220 was used at 5% by volume at 130° F. The substrates were treated with APS/BTSE solution as prepared in Example 3, then cured at 220° F. for 30 minutes. Infrared spectroscopy was considered to be one of the most powerful tools for the study of molecular structure and composition for years. It is well documented that siloxane group has a unique absorption at about 1000 cm$^{-1}$ in IR spectrum. Therefore, Nicolet AVATAR-360 FTIR was used to characterized the films deposited on metal surface by APS/BTSE before and after alkaline clean. After IR spectra were collected, these substrates were washed in the cleaner specified above. The IR spectra were collected again. The spectra before and after the clean for the same treatment and the same substrate were compared. If the absorption of siloxane group disappears after the clean, it indicates the siloxane film is removed.

Evaluation Results:

IR spectra indicated that alkaline cleaner can not remove those siloxane films on CRS and HDG and silicate cleaner can not remove the siloxane films on aluminium, neither. The results are shown in Table 11.

TABLE 11

Appearance of Siloxane Absorption in IR Spectrum

| | Aluminium | | HDG | | CRS | |
|---|---|---|---|---|---|---|
| | Before | After | Before | After | Before | After |
| γ-APS/BTSE | Yes | Yes | Yes | Yes | Yes | Yes |

What is claimed is:

1. A method of improving corrosion resistance of a metal substrate, comprising of the steps of:

(a) providing a metal substrate, the said metal substrate chosen from the group consisting of:
  steel;
  steel coated with a metal chosen from the group consisting of: zinc, zinc alloy, aluminum and aluminum alloy;
  iron;
  zinc and zinc alloys;
  aluminum; and
  aluminum alloy; and (b) applying a long-term coating on the metal substrate by contacting the metal substrate with a solution containing one or more hydrolyzed or partially hydrolyzed amino silanes, one or more hydrolyzed or partially hydrolyzed multi-silyl-functional silanes and a solvent, the amino silanes and multi-silyl-functional silanes being present in a ratio of between 2:1 to 1:8, and substantially removing the solvent.

2. The method according to claim 1, further comprising the step of curing said coating after step (b) at a temperature of between about 40° C. and 180° C.

3. The method according to claim 1, further comprising the step of applying a second solution containing one or more hydrolyzed or partially hydrolyzed amino silanes and one or more hydrolyzed or partially hydrolyzed multi-silyl-functional silanes to said metal substrate.

4. The method according to claim 1 further comprising the step of applying a second solution containing one or more hydrolyzed or partially hydrolyzed organofunctional silanes.

5. The method according to claim 1 wherein the amino silanes have the structure

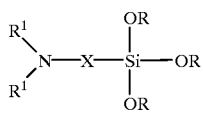

where R is chosen from the group consisting of hydrogen, $C_1$–$C_{24}$ alkyl, $C_2$–$C_{24}$ acyl, and each R may be the same or different;

X is a substituted or unsubstituted $C_1$–$C_{24}$ aliphatic or $C_1$–$C_{24}$ aromatic group, a $C_1$–$C_6$ alkenylene group, or a $C_1$–$C_6$ alkenylene substituted with at least one amino group; and each $R^1$ is individually selected from the group consisting of hydrogen, substituted or unsubstituted $C_1$–$C_{24}$ aliphatic or $C_1$–$C_{24}$ aromatic group.

6. The method according to claim 5, wherein each R is a hydrogen, $C_1$–$C_4$ alkyl group or $C_2$-$C_4$ acyl group.

7. The method according to claim 5, wherein X is selected from the group chosen from the group consisting of a bond, $C_1$–$C_6$ alkylene, $C_1$–$C_6$ alkenylene, $C_1$–$C_6$ alkylene substituted with at least one amino group, $C_1$–$C_6$ alkenylene substituted with at least one amino group, arylene and alkylarylene.

8. The method according to claim 5, wherein each $R^1$ is a group individually selected from the group consisting of hydrogen, $C_1$–$C_6$ alkyl, $C_1$–$C_6$ alkenyl, $C_1$–$C_6$ alkyl substituted with at least one amino group, $C_1$–$C_6$ alkenyl substituted with at least one amino group, arylene and alkylarylene.

9. The method according to claim 5, wherein each $R^1$ is individually selected from the group consisting of hydrogen, ethyl, methyl, propyl, iso-propyl, butyl, iso-butyl, sec-butyl, tert-butyl and acetyl.

10. The method according to claim 1, wherein the multi-silyl-functional silane has the general structure

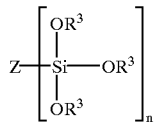

wherein Z is selected from the group consisting of $C_1$–$C_6$ alkylene, $C_1$–$C_6$ alkenylene, $C_1$–$C_6$ alkylene substituted with at least one amino group, $C_1$–$C_6$ alkenylene substituted with at least one amino group, arylene and alkylarylene;

$R^1$ is selected from the group consisting of hydrogen, $C_1$–$C_{24}$ alkyl and $C_2$–$C_{24}$ acyl, and may be the same or different; and, n is 2 or 3, and further wherein Z may be a bond when n is 2.

11. The method according to claim 10, wherein $R^3$ is selected from the group consisting of hydrogen, $C_1$–$C_6$ alkyl and $C_2$–$C_4$ acyl, and may be the same or different.

12. The method according to claim 11, wherein each $R^1$ is individually chosen from the group consisting of: ethyl, methyl, propyl, iso-propyl, butyl, iso-butyl, sec-butyl, tert-butyl and acetyl.

13. The method of claim 1, wherein the amino silane is γ-aminopropyltriethoxysilane.

14. The method of claim 1, wherein the multi-functional silane is 1,2-bis-(triethoxysilyl)ethane.

15. The method according to claim 1, wherein the solution additionally comprises an acid.

16. The method according to claim 15, wherein the acid is selected from the group consisting of: acetic, oxalic, formic or propionic acid.

17. The method according to claim 1, wherein the solvent comprises water.

18. The method of claim 1, wherein a polymer coating is applied on top of the silane coating.

19. The method of any claim 18, wherein the polymer coating is selected from the group consisting of paint, rubber and adhesive.

20. The method of claim 1, wherein the concentration of multi-silyl-functional silanes in the solution is between about 0.1% and about 10%.

21. The method of claim 1, wherein the concentration of amino silanes in the solution is between about 0.1 and 10%.

22. The method of claim 1, wherein the ratio of amino silanes to multi-silyl-functional silanes is in the range 4:1–1:8.

23. A method of improving corrosion resistance of a metal substrate, comprising the steps of:
(a) providing a metal substrate, the said metal substrate chosen from the group consisting of:
steel;
steel coated with a metal chosen from the group consisting of: zinc, zinc alloy, aluminum and aluminum alloy;
iron;
zinc and zinc alloys;
aluminum; and
aluminum alloy; and
(b) applying a solution to the metal substrate containing one or more hydrolyzed or partially hydrolyzed amino silanes, one or more hydrolyzed or partially hydrolyzed multi-silyl-functional silanes and a solvent wherein the amino silanes and multi-silyl-functional silanes are present in a ratio of between 2:1 to 1:8.

24. The method of claim 20 wherein the concentration of multi-silyl-functional silanes in the solution is between about 0.4% and about 3%.

25. The method of claim 24 wherein the concentration of multi-silyl-functional silanes in the solution is about 2%.

26. The method of claim 21 wherein the concentration of amino silanes in the solution is between about 0.2% and about 2%.

27. The method of claim 26 wherein the concentration of amino silanes in the solution is about 1%.

28. The method of claim 22 wherein the ratio of amino silanes to multi-silyl-functional silanes is in the range of 2:1–1:4.

29. The method of claim 28 wherein the ratio of amino silanes to multi-silyl-functional silanes is about 1:2.

30. The method of claim 1 wherein the step of applying the coating on the metal substrate comprises dipping the metal substrate into the solution so that the metal substrate contacts the solution for a period of time between about 2 seconds and about 50 minutes.

31. The method of claim 30 wherein the metal substrate contacts the solution for a period of time between about 0.5 minutes and about 2 minutes.

32. The method of claim 6 wherein R is selected from the group consisting of ethyl, methyl, propyl, butyl, iso-butyl, sec-butyl, tert-butyl and acetyl.

* * * * *